US012561188B2

(12) United States Patent
Hsu et al.

(10) Patent No.: US 12,561,188 B2
(45) Date of Patent: Feb. 24, 2026

(54) EXPANSION BOARD DETECTION

(71) Applicant: HEWLETT PACKARD ENTERPRISE DEVELOPMENT LP, Spring, TX (US)

(72) Inventors: Chi-Sheng Hsu, Taipei City (TW); Sheng Chi Huang, Taipei City (TW); Hung-Chu Lee, Taipei City (TW)

(73) Assignee: Hewlett Packard Enterprise Development LP, Spring, TX (US)

( * ) Notice: Subject to any disclaimer, the term of this patent is extended or adjusted under 35 U.S.C. 154(b) by 174 days.

(21) Appl. No.: 18/490,089

(22) Filed: Oct. 19, 2023

(65) Prior Publication Data

US 2025/0130614 A1 Apr. 24, 2025

(51) Int. Cl.
*G06F 11/00* (2006.01)
*G06F 13/40* (2006.01)

(52) U.S. Cl.
CPC .......... *G06F 11/00* (2013.01); *G06F 13/4068* (2013.01)

(58) Field of Classification Search
CPC ............................................. G02B 2027/0138
See application file for complete search history.

(56) References Cited

U.S. PATENT DOCUMENTS

| | | | | | |
|---|---|---|---|---|---|
| 5,581,201 | A | * | 12/1996 | Sonner | G06F 1/22 |
| | | | | | 327/333 |
| 8,521,936 | B2 | * | 8/2013 | Brandyberry | G06F 1/20 |
| | | | | | 710/301 |
| 10,050,362 | B2 | * | 8/2018 | Abel | H05K 1/0231 |
| 2008/0024414 | A1 | | 1/2008 | Shih et al. | |

FOREIGN PATENT DOCUMENTS

| | | |
|---|---|---|
| TW | 200825753 A | 6/2008 |
| TW | 201524035 A | 6/2015 |

OTHER PUBLICATIONS

Wikipedia, Expansion card downloaded Oct. 2, 2023 (7 pages).
Wikipedia, JTAG downloaded Oct. 2, 2023 (15 pages).
Wikipedia, Riser card downloaded Oct. 2, 2023 (3 pages).

* cited by examiner

*Primary Examiner* — Henry Tsai
*Assistant Examiner* — Juanito C Borromeo
(74) *Attorney, Agent, or Firm* — Trop, Pruner & Hu, P.C.

(57) ABSTRACT

In some examples, a system includes a circuit board having a connector to receive an expansion board. The system includes a controller to detect a state of a signal from the connector and determine a presence or absence of the expansion board in the connector based on the detected state of the signal from the connector. The determining includes indicating the presence of the expansion board in the connector responsive to the signal having a first state as set by a passive circuit on the expansion board through the connector.

20 Claims, 5 Drawing Sheets

EXPANSION BOARD DETECTION

BACKGROUND

An electronic system can include various electronic components that can be mounted on one or more circuit boards of the electronic system. Examples of electronic components include any or some combination of the following: processors, memory devices, network interface controllers, input/output (I/O) devices, or other types of electronic components.

BRIEF DESCRIPTION OF THE DRAWINGS

Some implementations of the present disclosure are described with respect to the following figures.

Figure 1:
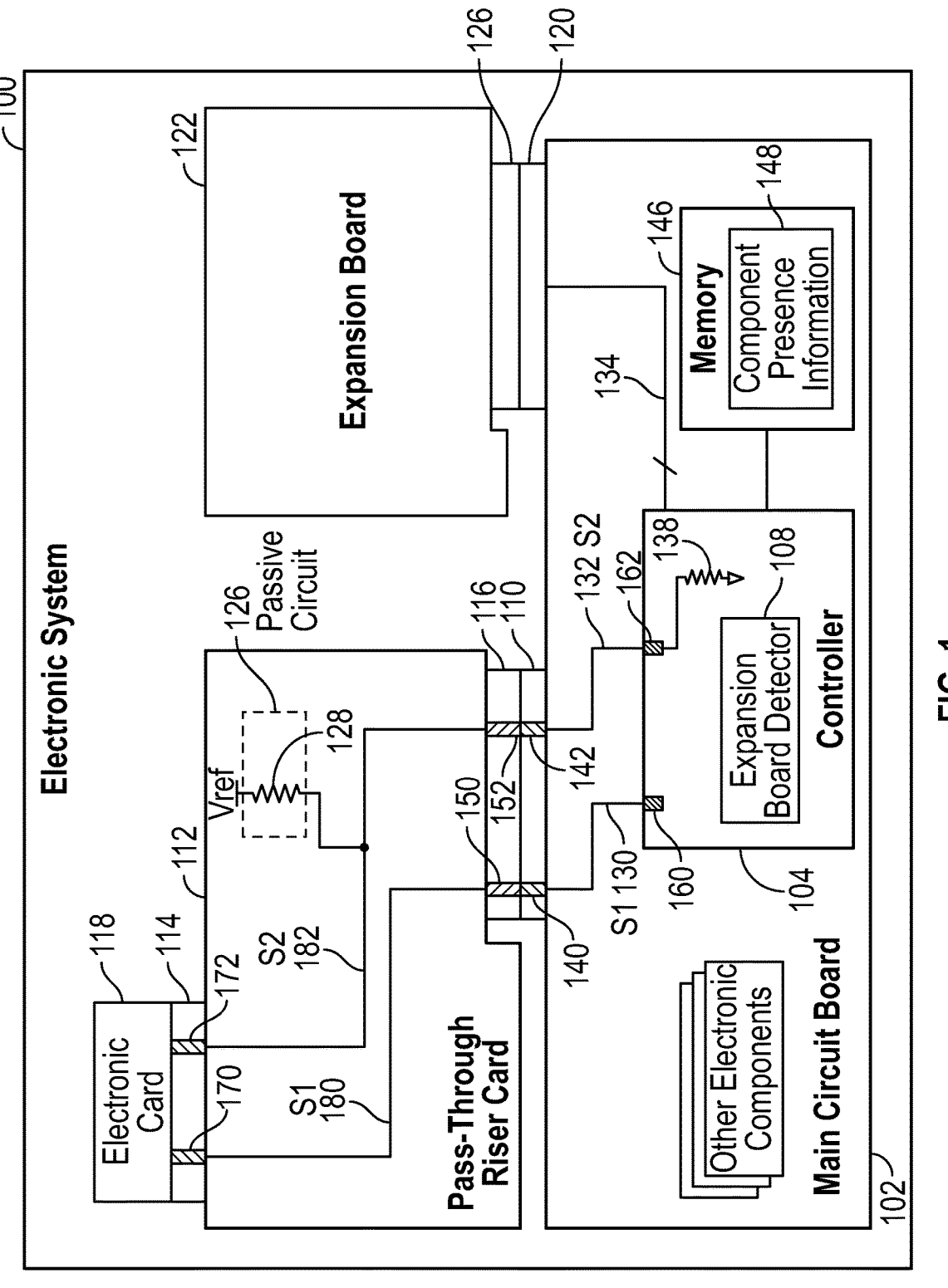
FIG. 1 is a block diagram of an electronic system that includes a main circuit board to which is mounted a pass-through riser card and an expansion board, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

An electronic system can include a connector to receive an expansion board to support adding functionality to the electronic system. In some cases, an electronic system can include multiple connectors to receive multiple expansion boards. An "expansion board" refers to an assembly that is selectively pluggable to a connector of an electronic system, such as to a connector of a main circuit board of the electronic system. This connector of the electronic system is referred to as a "system connector."

In some examples, an expansion board is a "pass-through" expansion board, which refers to an expansion board having signal paths that interconnect two other electronic components, such as a main circuit board to an electronic card that is separate from the main circuit board. The pass-through expansion board has an expansion connector to which the separate electronic card can connect. In addition to the expansion connector, the pass-through expansion board has another connector to connect to the system connector of the electronic system. The pass-through expansion board thus includes two connectors (or more than two connectors), including the expansion connector to connect to a separate electronic card, and another connector to connect to the system connector (such as on a main circuit board) of the electronic system.

A challenge during the manufacture of electronic systems is the ability to confirm whether components that are supposed to be part of the electronic systems are in fact present in the electronic systems. For example, manufacturing information, which may be in the form of a bill of material (BOM), may specify that a given electronic system should include a pass-through expansion board and a specific type of electronic card connected to the expansion connector of the pass-through expansion board. In some cases, an electronic system may include an expansion board detector that detects the presence of a pass-through expansion board in a system connector of the electronic system based on interactions between the expansion board detector and an active integrated circuit on the pass-through expansion board. However, the active integrated circuit on the pass-through expansion board used for expansion board detection can add to the cost and increase the size of the pass-through expansion board. Further, if the active integrated circuit is not present on a pass-through expansion board, then the expansion board detector may not be able to detect presence of such pass-through expansion board. In some cases, dedicated signals may have to be used for expansion board detection. Connectors that conform to specific standards (e.g., the Peripheral Component Interconnect Express (PCIe) standard, or any other connector standard) may not have pins to support the use of such dedicated signals.

In accordance with some implementations of the present disclosure, an expansion board detector can detect the presence of an expansion board in a system connector of an electronic system without the use of any active integrated circuit on the expansion board. In addition, the expansion board detector can use an existing multipurpose pin of the system connector for communicating a signal used in the expansion board detection.

In some examples of the present disclosure, the expansion board includes a passive circuit that can set the multipurpose pin of the system connector to a specified state to indicate the presence of the expansion board in the system connector. The multipurpose pin is dynamically settable as an input pin and an output pin at different times. When set as an input pin, the multipurpose pin of the system connector provides an input to a controller of the electronic system. When set as an output pin, the multipurpose pin of the system connector receives an output signal from the controller of the electronic system.

For example, the multipurpose pin can be set as an input pin at the first time to support expansion board detection. The multipurpose pin can be set as an output pin from the main circuit board at a second time to support communications between the controller and an electronic card plugged in an expansion connector of the expansion board.

FIG. 1 is a block diagram of an example electronic system 100 according to some implementations of the present disclosure. The electronic system 100 may include any or some combination of the following: a computer (e.g., a desktop computer, a server computer, a notebook computer, etc.), a game appliance, a household appliance, a vehicle or a portion of a vehicle, a network device (e.g., a switch, a router, a gateway, etc.), a storage system, or any other type of electronic device.

The electronic system 100 includes a main circuit board 102 that includes a controller 104 on the circuit board 102. As used here, a "main circuit board" refers to a circuit board that includes specific electronic components (depicted as "other electronic components 106" in FIG. 1) of an electronic system, such as a host processor, a memory device, and/or other electronic components. A main circuit board can also be referred to as a motherboard. Note that the electronic system 100 may include multiple main circuit boards in some examples.

As used here, a "controller" can refer to one or more hardware processing circuits, which can include any or some combination of a microprocessor, a core of a multi-core microprocessor, a microcontroller, a programmable integrated circuit (e.g., a complex programmable logic device, an application specific integrated circuit device, etc.), a programmable gate array, or another hardware processing circuit. Alternatively, a "controller" can refer to a combination of one or more hardware processing circuits and machine-readable instructions (software and/or firmware) executable on the one or more hardware processing circuits.

The controller 104 includes an expansion board detector 108 according to some examples of the present disclosure. The expansion board detector 108 can be implemented using a portion of the hardware processing circuitry of the controller 104, or as machine-readable instructions executable by the controller 104.

The main circuit board 102 includes a system connector 110 to which a pass-through riser card 112 can be connected. A pass-through riser card is an example of an expansion card that can be connected to the system connector 110.

A "connector" can refer to a physical structure with electrical contacts (and/or optical contacts) to which another device can connect. The connector can be in the form of a slot including contacts (electrical contacts and/or optical contacts), a projection including contacts, or any other structure with contacts to allow one electronic component to be connected to another electronic component.

A "board" can refer to any support structure on which electronic components and/or signal paths can be arranged. The terms "card" and "board" are used interchangeably herein.

A "riser card" refers to an expansion board that rises above the surface of the main circuit board 102, so that space is provided for a separate electronic card (e.g., an electronic card 118) to be connected to an expansion connector 114 of the pass-through riser card 112. The pass-through riser card 112 further includes a system-side connector 116 to mate with the system connector 110 of the main circuit board 102. Thus, the pass-through riser card 112 includes the following connectors: the expansion connector 114 to receive the electronic card 118, and the system-side connector 116 to mate with the system connector 110 of the main circuit board 102. In further examples, the pass-through riser card 112 can include more than two connectors.

An "electronic card" can refer to any electronic component that can be connected to another component, such as the main circuit board 102 or another component.

A "pass-through" riser card (or more generally, a pass-through expansion board) refers to a riser card (or expansion board) that has signal paths from the system-side connector 116 to the expansion connector 114, so that electronic component(s) on the main circuit board 102 is (are) able to communicate with the electronic card 118 when the electronic card 118 is connected to the expansion connector 114 and the pass-through riser card 112 is connected in the system connector 110 of the main circuit board 102. In some cases, a pass-through riser card (or more generally, a pass-through expansion board) does not include any active integrated circuit. An "active integrated circuit" refers to a circuit that can deliver power to another component when the circuitry is activated. In contrast, a "passive circuit" refers to a circuit that draws power (and does not deliver power). Examples of active integrated circuits can include any or some combination of the following: a voltage or current source, a transistor (or a collection of transistors), or any other component that is capable of delivering power when activated. Examples of passive circuits include a resistor, an inductor, or a capacitor (or a combination of the foregoing).

In some examples, the system connector 110, which may be a PCIe connector or another type of connector, may receive other types of electronic components in addition to the pass-through riser card 112. Thus, the system connector 110 can be used with any of various different types of electronic components while still being able to leverage contacts of the system connector 110 for detecting presence or absence of the pass-through riser card 112 and the electronic card 118.

In some examples, the main circuit board 102 may include a second system connector 120 that is able to receive another expansion board 122. The expansion board 122 includes a system-side connector 116 to mate with the system connector 120. The expansion board 122 may or may not have another connector to connect to another electronic component.

In some examples, the system connectors 110 and 120 can include PCIe connectors that conform to the PCIe standard. In other examples, the system connectors 110 and 120 may be according to other connector protocols, including standardized protocols, open-source protocols, or proprietary protocols. A connector that is according to a given protocol includes a set of contacts (electrical and/or optical contacts) that is defined by the given protocol.

The controller 104 on the main circuit board 102 is connected by various signals to respective contacts of the system connector 110. The signals include an S1 signal 130 and an S2 signal 132. Other signals (not shown) are also connected between the controller 104 and the system connector 110. Although specific names are assigned to the signals of FIG. 1, it is noted that in other examples, different signal names can be assigned to the signals 130, 132, and 134 between the controller 104 and the system connector 110. In some cases, the S1 signal 130 and the S2 signal 132 can serve multiple purposes (i.e., the S1 signal 130 and the S2 signal 132 are multipurpose signals). As explained below, the S1 signal 130 and the S2 signal 132 can be used during a component detection process to detect the presence (or absence) of the electronic card 118 and the pass-through riser card 112. After the component detection process is completed, the S1 signal 130 and the S2 signal 132 can be used for other purposes, such as to perform diagnostics of the electronic card 118 if present. For example, the S1 signal 130 and the S2 signal 132 may be signals of a test interface, such as a test interface according to the Joint Test Action Group (JTAG) standard. A test interface according to the JTAG standard is referred to as a "JTAG interface." In other examples, a test interface may be according to another test protocol.

In some examples, the S1 signal 130 can be used as a test reset (TRST) signal of the JTAG interface, and the S2 signal 132 can be used as a Test Mode Select (TMS) signal of the JTAG interface. The JTAG interface can include other signals (not shown) as well. The TRST signal is used to reset test logic of a target component (such as the electronic card 118), and the TMS signal is used to select a test mode of the target component.

The controller 104 can be connected by similar signals 134 to the system connector 120.

The S1 signal 130 is connected between an S1 contact 140 of the system connector 110 and an S1 pin 160 of the controller 104, and the S2 signal 132 is connected between an S2 contact 142 of the system connector 110 and an S2 pin 162 of the controller 104. A "pin" of a controller can refer to any contact of the controller that allows the controller to communicate with a component external of the controller.

The system-side connector 116 of the pass-through riser card 112 includes corresponding S1 and S2 contacts 150 and 152. More specifically, when the system-side connector 116 is mated with the system connector 110, the S1 contact 150 of the system-side connector 116 engages the S1 contact 140, and the contact 152 of the system-side connector 116 engages the S1 contact 142.

The contact 150 of the system-side connector 116 is connected to an S1 signal 180 on the pass-through riser card 112, and the contact 152 of the system-side connector 116 is connected to an S2 signal 182 on the pass-through riser card 112. The S1 signal 180 is connected to an S1 contact 170 of the expansion connector 114 of the pass-through riser card 112, and the S2 signal 182 is connected to an S2 contact 172 of the expansion connector 114 of the pass-through riser card 112. When the system-side connector 116 of the pass-through riser card 112 is mated to the system connector 110 of the main circuit board, the S1 signal 180 is electrically connected to the S1 signal 130 on the main circuit board 102, and the S2 signal 182 is electrically connected to the S2 signal 132 on the main circuit board 102.

The S2 signal 132 is used by the expansion board detector 108 to detect presence of the pass-through riser card 112 in the system connector 110. In some examples, the controller 104 can dynamically set the S2 pin 162 of the controller 104 as either an input pin or an output pin at different times. When the S2 pin 162 of the controller 104 is set as an input pin, the S2 signal 132 is an input to the controller 104. When the S2 pin 162 of the controller 104 is set as an output pin, the S2 signal 132 is an output from the controller 104.

The controller 104 has multiple operational modes. When the controller 104 is in a component detection operational mode, the controller 104 sets the S2 pin 162 as an input pin to perform a component detection process, more specifically, to detect whether the pass-through riser card 112 is connected in the system connector 110. In a second operational mode, the controller 104 sets the S2 pin 162 as an output pin to allow the controller 104 to communicate a signal to a target component, such as the electronic card 118 connected to the expansion connector 114 of the pass-through riser card 112. In the second operational mode, the signal sent by the controller 104 to the target component may be a signal of a JTAG interface, for example.

In accordance with some examples of the present disclosure, a passive circuit 126 is provided on the pass-through riser card 112 to set the S2 signal 182 to a reference. For example, the passive circuit 126 can include a pullup resistor 128 that is connected to a reference voltage (Vref). The pullup resistor pulls the S2 signal 182 on the pass-through riser card 112 to Vref. Vref may be a high power supply voltage provided by a power supply of the electronic system 100, for example, or any other type of reference voltage. In other examples, the passive circuit 126 can include a pulldown resistor to pull the S2 signal 182 to a low reference, such as ground or a lower voltage that is lower than a high power supply voltage from the power supply.

In some examples assuming that the pass-through riser card 112 includes the pullup resistor 128, the controller 104 on the main circuit board 102 includes a pulldown resistor 138 that is connected to the S2 pin 162. The pulldown resistor 138 pulls the S2 pin 162 of the controller 104 to a low reference (e.g., ground) unless the S2 signal 132 is driven to a different state by an external component, such as by the pullup resistor 128 of the pass-through riser card 112 when the pass-through riser card 112 is connected to the system connector 110.

Thus, if the pass-through riser card 112 is connected in the system connector 110, the pullup resistor 128 of the pass-through riser card 112 will set the S2 signal 182 to Vref, which causes the S2 signal 132 to be set at Vref. When the controller 104 sets the S2 pin 162 as an input pin during the component detection operational mode, the S2 signal 132 being set at Vref causes the S2 pin 162 to be set at Vref. In this case, the expansion board detector 108 can determine that the pass-through riser card 112 is present in the system connector 110 based on the S2 pin 162 being set at Vref.

On the other hand, if no pass-through riser card 112 connected to the system connector 110 when the controller 104 is in the component detection operational mode, the pulldown resistor 138 in the controller 104 sets the S2 pin 162 of the controller 104 to a low reference. In this case, the expansion board detector 108 can determine that the pass-through riser card 112 is not present in the system connector 110 based on the S2 pin 162 being set at the low reference.

In other examples, if the passive circuit 126 of the pass-through riser card 112 includes a pulldown resistor, then the controller 104 would include a pullup resistor connected to the S2 pin 162 of the controller 104.

When the controller 104 is in the second operational mode and the S2 pin 162 is set as an output pin, the controller 104 can disconnect the pulldown resistor 138 from the S2 pin 162 so that the controller 104 can drive an output signal from the S2 pin 162.

The expansion board detector 108 can employ a similar technique to detect a presence (or absence) of the expansion board 122 in the system connector 120.

By using passive circuits on expansion boards (such as the pass-through riser card 112 and the expansion board 122) for expansion board presence detection, techniques or mechanisms according to some implementations of the present disclosure can use small form factor expansion boards, since active integrated circuits do not have to be included in an expansion board to support expansion board presence detection. Additionally, by using passive circuits rather than active integrated circuits for expansion board presence detection, overall component costs relating to expansion boards can be reduced since the design of the expansion boards is simplified.

The component detection process of the expansion board detector 108 also detects presence of the electronic card 118 in the expansion connector 114 of the pass-through riser card 112. The expansion board detector 108 uses the S1 signal 130 for detecting a presence (or absence) of the electronic card 118 in the expansion connector 114 of the pass-through riser card 112.

The controller 104 is connected to a memory 146, which can be implemented using one or more memory devices. A memory device can include any or some combination of a dynamic random access memory (DRAM) device, a static random access memory (SRAM) device, a flash memory device, or another type of memory device.

The controller 104 is able to write a result of the component detection process to the memory 146. For example, the expansion board detector 108 can generate information (e.g., in the form of a value or a set of values) indicating the presence (or absence) of the pass-through riser card 112 and the electronic card 118. This information can be written by the controller 104 to the memory 146 as component presence information 148.

With respect to the pass-through riser card 112 and the electronic card 118, the component presence information 148 can indicate any of the possible cases set forth in Table 1 below.

TABLE 1

| Connector | Riser Card Present | Electronic Card Present | Value |
|---|---|---|---|
| 110 | Yes | No | aaa |
| 110 | Yes | Yes | bbb |
| 110 | No | No | ccc |

The values "aaa," "bbb," and "ccc" can be any arbitrary values. According to Table 1, the component presence information 148 if set to the value "aaa" indicates that the pass-through riser card 112 is present in the system connector 110 but the electronic card 118 is absent from the expansion connector 114. The component presence information 148 if set to the value "bbb" indicates that the pass-through riser card 112 is present in the system connector 110 and the electronic card 118 is present in the expansion connector 114. The component presence information 148 if set to the value "ccc" indicates that the pass-through riser card 112 is absent from the system connector 110 and the electronic card 118 is present in the expansion connector 114.

In examples according to Table 1, one value (e.g., any of "aaa," "bbb," or "ccc") is used to indicate whether the pass-through riser card 112 and the electronic card 118 are present. In other examples, two different values can be used: a first value to represent the presence (or absence) of the pass-through riser card 112, and a second value to represent the presence (or absence) of the electronic card 118.

Similar component presence information can be written to the memory 146 for indicating a presence (or absence) of the expansion board 122 (and of an electronic card on the expansion board 122).

In some examples, the electronic card 118 that can be connected to the expansion connector 114 is a retimer card. The retimer card is used to adjust timings of signals that are to be communicated between the main circuit board 102 and another component connected to the retimer card.

In some examples, an entity at the electronic system 100 or a remote entity is able to access the component presence information in the memory 146. For example, a user or a program of the electronic system 100 can access the component presence information for determining whether the pass-through riser card 112 and the expansion board 122 are present (and if any electronic cards are connected to the pass-through riser card 112 and the expansion board 122).

Alternatively, a remote entity such as a remote user or a program at a remote electronic device (not shown) is able to access the component presence information in the memory 146. The accessed component presence information can be presented in a user interface of the remote electronic device, for example.

Figure 2:
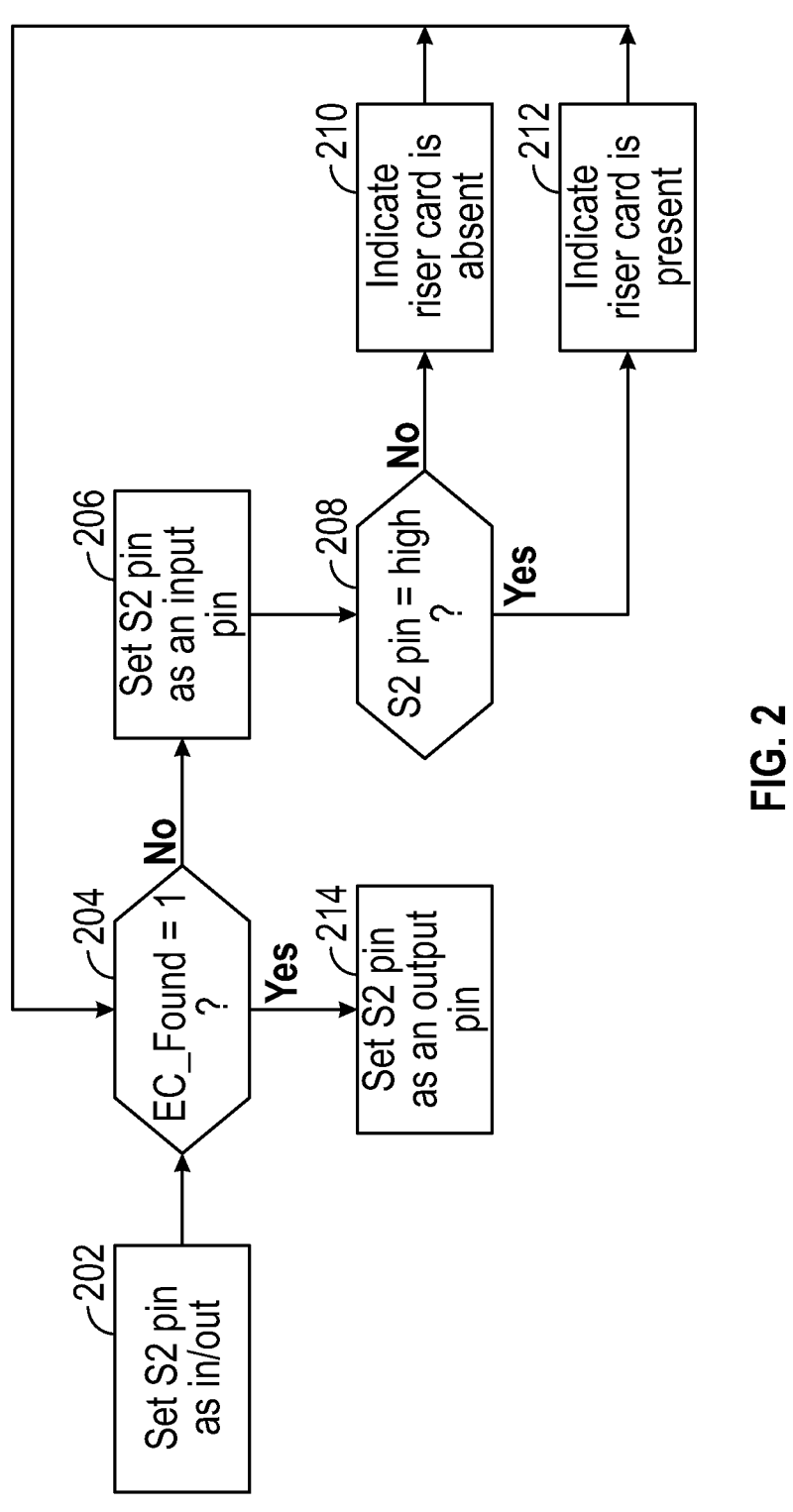
FIG. 2 is a flow diagram of a process of detecting presence of a pass-through riser card, according to some examples.

FIG. 2 is a flow diagram of a process for detecting presence of the pass-through riser card 112, according to some examples. The process of FIG. 2 can be performed by the controller 104 of FIG. 1, for example. Although FIG. 2 depicts a specific sequence of tasks, it is noted that in other examples, the tasks can be performed in a different order, some of the tasks may be omitted, and/or additional tasks may be added.

Initially (such as when the controller 104 is initially powered up or after a reset of the controller 104), the controller 104 sets (at 202) the S2 pin 162 of the controller 104 as in/out, which means that the S2 pin 162 can be used as either an input or an output pin. The expansion board detector 108 determines (at 204) whether the electronic card 118 has been detected, which can be indicated by a parameter EC_Found set equal to an active value. In examples according to FIG. 2, the active value of EC_Found is "1". In other examples, the active value of EC_Found is "0."

Note that when the pass-through riser card 112 is initially inserted in the system connector 110 of the main circuit board 102, the electronic card 118 would not have been detected; as a result, EC_Found is initially set to an inactive value (e.g., "0" or alternatively, "1").

If EC_Found does not have the active value, the controller 104 sets (at 206) the S2 pin 162 as an input pin (which means that the controller 104 would receive a signal at the S2 pin 162). As noted above, the controller 104 sets the S2 pin 162 as an input pin in the component detection operational mode.

The expansion board detector 108 in the controller 104 determines (at 208) whether the S2 pin 162 is set at an active value, which indicates that the pass-through riser card 112 is inserted in the system connector 110. In examples according to FIG. 2, the active value of the S2 pin 162 is a high state corresponding to the Vref voltage level set by the pullup resistor 128 of the pass-through riser card 112. In other examples, the active value of the S2 pin 162 is a low state corresponding to a low reference such as ground.

If the S2 pin 162 is not set at the active value, then the expansion board detector 108 indicates (at 210) that the pass-through riser card 112 is absent from the system connector 110. However, if the expansion board detector 108 detects that the S2 pin 162 is at the active value, then the expansion board detector 108 indicates (at 212) that the pass-through riser card 112 is present in the system connector 110.

From either task 210 or 212, the expansion board detector 108 again determines (at 204) whether the electronic card 118 has been detected (e.g., EC_Found is "1"). If so, the controller 104 sets (at 214) the S2 pin 162 as an output pin, so that the controller 104 can drive the S2 signal 132, such as to use as the TMS signal of the JTAG interface for performing a test operation of the electronic card 118 (e.g., to debug the electronic card 118).

Figure 3:
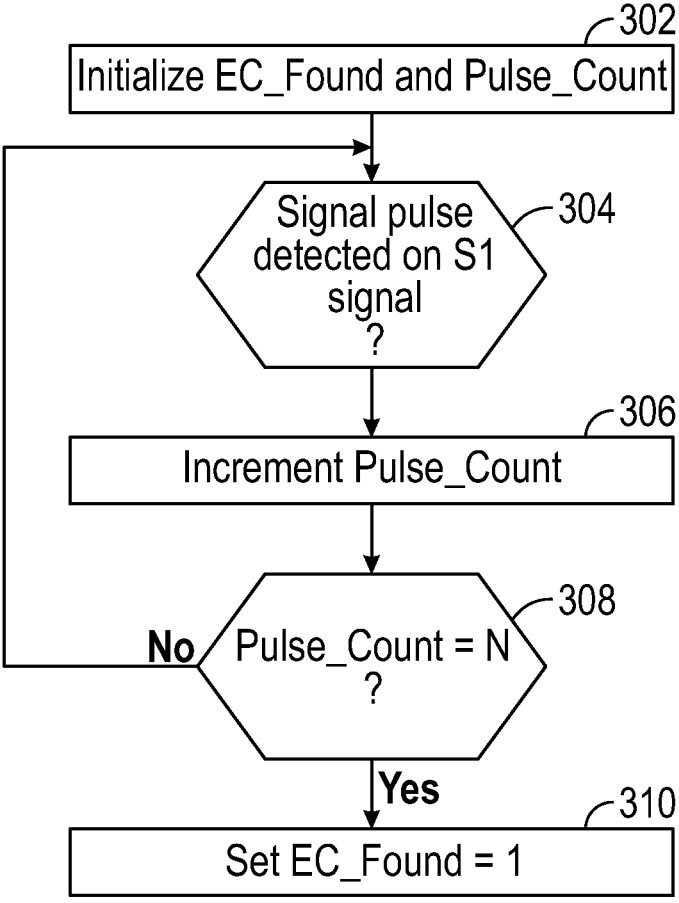
FIG. 3 is a flow diagram of a process of detecting an electronic card, according to some examples.

FIG. 3 is a flow diagram of a process for detecting presence of the electronic card 118, which can be performed by the controller 104 of FIG. 1, for example. Although FIG. 3 depicts a specific sequence of tasks, it is noted that in other examples, the tasks can be performed in a different order, some of the tasks may be omitted, and/or additional tasks may be added.

The expansion board detector 108 initializes (at 302) the EC_Found parameter to an inactive value (e.g., "0") (which indicates that the electronic card 118 is not present), and a Pulse_Count parameter to an initial value (e.g., 0 or another initial value).

The expansion board detector 108 determines (at 304) whether a signal pulse of a specified width on the S1 signal 130 (connected to the S1 pin 160 of the controller 104) is detected. In some examples, when the electronic card 118 is initially started (such as upon insertion in the expansion connector 114 of the pass-through riser card 112), the electronic card 118 issues a train of signal pulses on S1 signal, which is communicated to the controller 104 through the S1 contact 170 of the expansion connector 114, the S1 signal 180 on the pass-through riser card 112, the contacts 150, 140 of the system-side connector 116 and the system connector 110, respectively, and the S1 signal 130 on the main circuit board 102.

A pulse of the S1 signal is a pulse of a given width, such as 4 microseconds (µs) or a different pulse width. The train of pulses of the S1 signal can include a sequence of N pulses, where N≥1.

In response to detecting the signal pulse, the expansion board detector 108 increments (at 306) the Pulse_Count parameter. The expansion board detector 108 determines (at 308) whether Pulse_Count is equal to N.

If Pulse_Count is not equal to N, the expansion board detector 108 proceeds to detect (at 304) the next pulse on the S1 signal. However, if Pulse_Count is equal to N, the expansion board detector 108 sets (at 310) the parameter EC_Found to the active value (e.g., "1") to indicate that the electronic card 118 has been detected.

Figure 4:
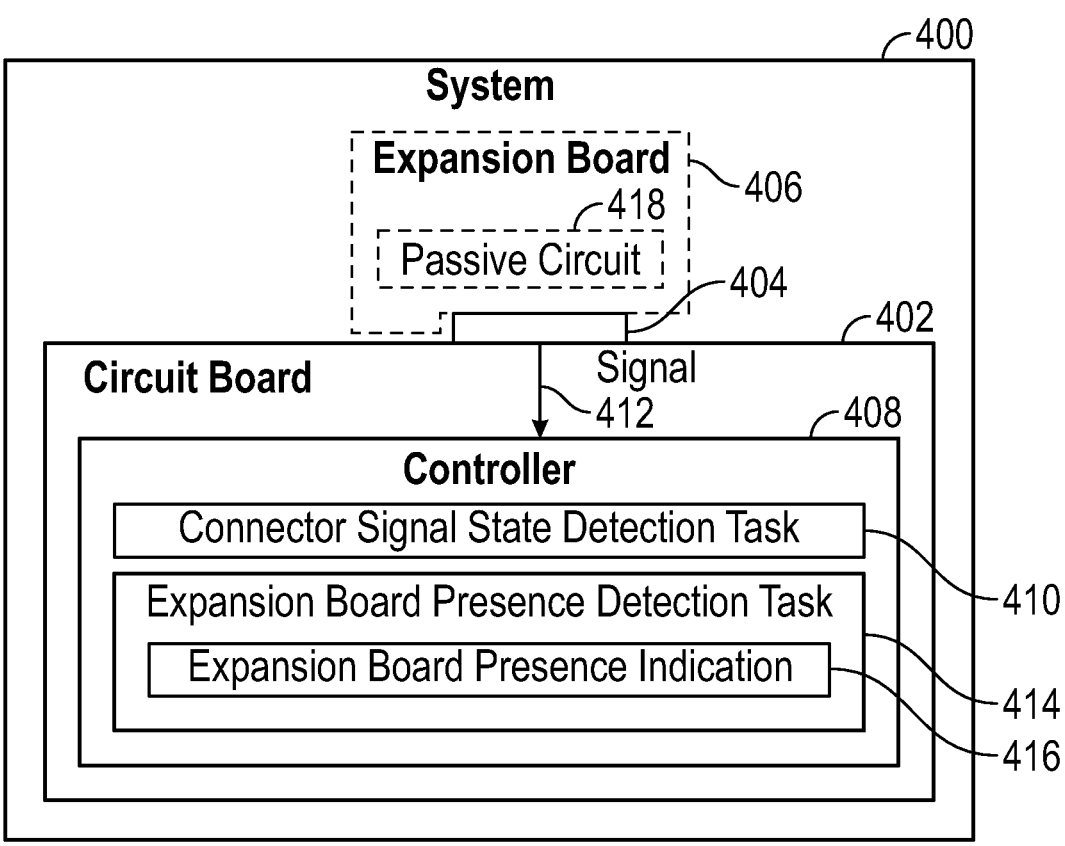
FIG. 4 is a block diagram of a system according to some examples.

FIG. 4 is a block diagram of a system 400 according to some examples. An example of the system 400 is the electronic system 100 of FIG. 1. The system 400 includes a circuit board 402 that has a system connector 404 to receive an expansion board 406. An example of the circuit board 402 is the main circuit board 102 of FIG. 1. An example of the expansion board 406 is the pass-through riser card 112 or the expansion board 122 of FIG. 1.

The system 400 further includes a controller 408 that is able to perform various tasks. An example of the controller 408 is the controller 104 with the expansion board detector 108 of FIG. 1.

The tasks of the controller 408 (which may be performed by hardware processing circuitry or machine-readable instructions of the controller 408) include a connector signal state detection task 410 to detect a state of a signal 412 from the system connector 404. An example of the signal 412 is the S2 signal 132 of FIG. 1.

The tasks of the controller 408 further include an expansion board presence detection task 414 to determine a presence or absence of the expansion board 406 in the system connector 404 based on the detected state of the signal 412 from the system connector 404. The determination of the expansion board presence detection task 414 includes indicating 416 the presence of the expansion board in the system connector 404 responsive to the signal 412 having a first state as set by a passive circuit 418 on the expansion board 406 through the system connector 404.

Note that if the expansion board 406 is not present in the system connector 404, the controller 408 would indicate an absence of the expansion board 406 in the system connector 404.

In some examples, the passive circuit 418 includes a resistor to pull a contact of the system connector 404 to the first state, the contact connected to the signal 412. An example of the resistor of the passive circuit 418 is the pullup resistor 128 of FIG. 1.

In some examples, the signal 412 is part of a test interface (e.g., a JTAG interface) for testing of an electronic card connected to an expansion connector of the expansion board 406.

In some examples, the controller 408 has a pin connected to the signal 412. The controller 408 sets the pin as an input pin at a first time during a detection process to determine the presence or absence of the expansion board 406 in the system connector 404. An example of the pin of the controller 408 is the S2 pin 162 of FIG. 1.

In some examples, the controller 408 sets the pin as an output pin at a second time for sending a control indication from the controller 408 to an electronic card connected to an expansion connector of the expansion board 406. The control indication can be an output signal, such as a signal of a JTAG interface.

In some examples, the controller 408 determines a presence or absence of the electronic card in the expansion connector of the expansion board 406, and the controller 408 sets the pin as the output pin at the second time responsive to determining that the electronic card is present in the expansion connector of the expansion board 406.

In some examples, the controller 408 refrains from setting the pin as the output pin responsive to determining that the electronic card is not present in the expansion connector of the expansion board 406.

In some examples, the system connector 404 has a first contact connected to the signal 412. The controller 408 determines that the electronic card is present in the expansion connector of the expansion board 406 based on detecting a predefined pattern of a signal from a second contact of the system connector 404 of the circuit board 402. An example of the signal is the S1 signal 130 of FIG. 1.

In some examples, the predefined pattern of the signal from the second contact is driven by the electronic card in the expansion connector of the expansion board 406. The predefined pattern of the signal from the second contact can include a train of pulses of the signal.

In some examples, the expansion board 406 is a pass-through riser card (e.g., 112 in FIG. 1) that is without any active integrated circuits on the expansion board 406.

In some examples, the system 400 further includes a memory (e.g., 146 in FIG. 1). The controller 408 writes, to the memory, a value indicating the presence or absence of the expansion board 406 in the system connector 404.

In some examples, the controller 408 determines a presence or absence of an electronic card in an expansion connector of the expansion board 406, and the controller 408 writes, to the memory, the value or a further value indicating the presence or absence of the electronic card in the expansion connector of the expansion board.

In some examples, the system connector 404 on the circuit board is connectable to the expansion board 406 or an electronic card.

Figure 5:
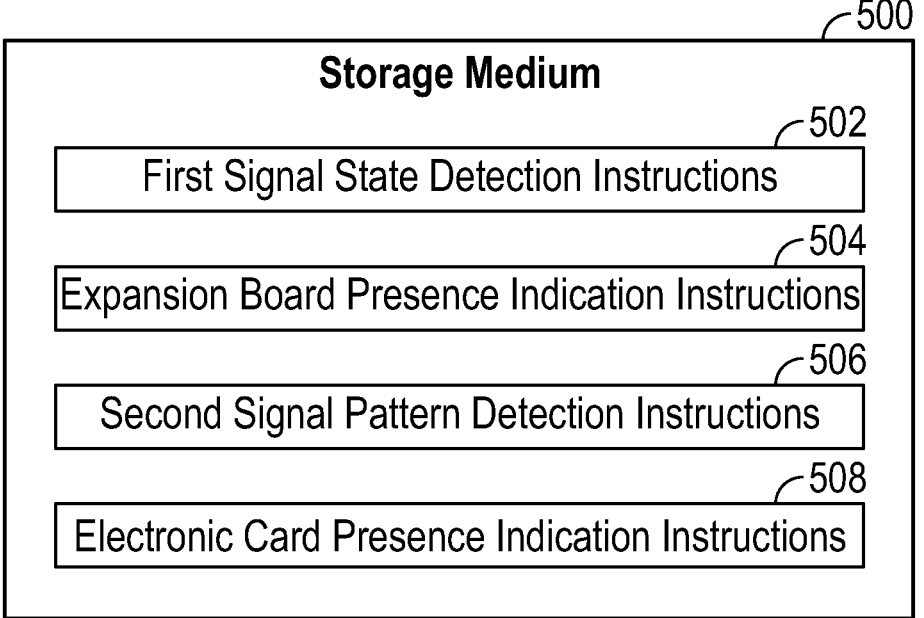
FIG. 5 is a block diagram of a storage medium storing machine-readable instructions according to some examples.

FIG. 5 is a block diagram of a non-transitory machine-readable or computer-readable storage medium 500 storing machine-readable instructions that upon execution cause a controller to perform various tasks. The storage medium 500 may include a memory of the controller, such as the controller 104 of FIG. 1.

The machine-readable instructions include first signal state detection instructions 502 to detect a first state of a first signal from a first contact of a connector on a circuit board, such as the main circuit board 102 of FIG. 1.

The machine-readable instructions include expansion board presence indication instructions 504 to indicate a presence of an expansion board in the connector based on the first state of the first signal from the first contact of the connector. The first signal has the first state based on a passive circuit on the expansion board setting the first signal to the first state through the connector. An example of the first contact of the connector is the S2 contact 142 of the system connector 110 of FIG. 1.

The machine-readable instructions include second signal pattern detection instructions 506 to detect a signal pattern of a second signal from a second contact of the connector on the circuit board. An example of the second contact of the connector is the S1 contact 140 of the system connector 110 of FIG. 1.

The machine-readable instructions include electronic card presence indication instructions 508 to indicate a presence of an electronic card in an expansion connector of the expansion board based on the signal pattern of the second signal. The signal pattern is driven by the electronic card.

In some examples, the machine-readable instructions transition the controller to a component detection operational mode that includes setting the first contact of the controller as an input contact. The detecting of the first state of the first signal occurs during the component detection operational mode of the controller. Setting the first contact as an input contact can be accomplished by the controller setting a first pin of the controller, where the first pin is connected to the first contact of the connector, as an input pin, so that the first pin of the controller can receive a signal from the first contact of the connector.

In some examples, the machine-readable instructions transition the controller from the component detection operational mode to a second operational mode in which the first contact is set as an output contact. Setting the first contact as an output contact can be accomplished by the controller setting the first pin of the controller as an output pin, so that the controller can drive an output signal from the first pin to the first contact of the connector.

Figure 6:
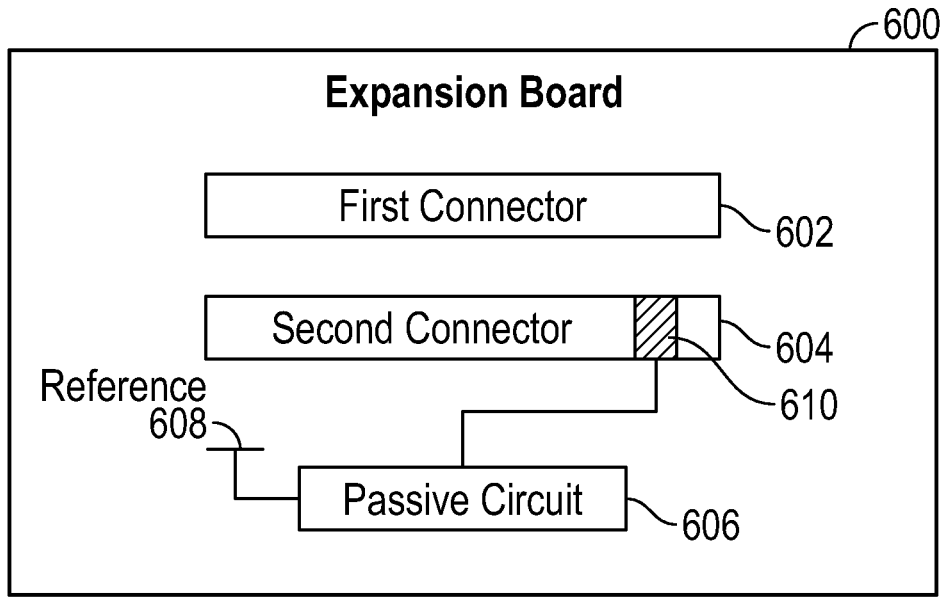
FIG. 6 is a block diagram of an expansion board according to some examples.

FIG. 6 is a block diagram of an expansion board 600 for mounting in a system connector of a circuit board. An example of the expansion board is the pass-through riser card 112 or the expansion board 122 of FIG. 1.

The expansion board 600 includes a first connector 602 to receive an electronic card, and a second connector 604 to connect to the system connector of the circuit board.

The expansion board 600 includes a passive circuit 606 connected to a reference 608 and to a contact 610 of the second connector 604 to provide a presence indication of the expansion board 600 in the system connector of the circuit board. An example of the passive circuit 606 is the passive circuit 126 of FIG. 1. The reference 608 can be a reference voltage (e.g., Vref in FIG. 1) or a low reference (e.g., ground).

The contact 610 is settable as an input to the circuit board at a first time during an expansion board detection process to determine a presence or absence of the expansion board 600 in the system connector of the circuit board. The contact 610 is settable as an input to the circuit board responsive to a controller (e.g., 104 in FIG. 1) on the circuit board setting a pin of the controller as an input, where the pin of the controller is coupled to the contact 610 of the second connector 604 through the system connector.

The contact 610 is settable as an output from the circuit board at a second time to support a communication of the controller on the circuit board to the electronic card. The contact 610 is settable as an output from the circuit board responsive to the controller on the circuit board setting the pin of the controller as an output.

The storage medium (e.g., 500 in FIG. 5) can include any or some combination of the following: a semiconductor memory device such as a DRAM or SRAM, an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A system comprising:
a circuit board comprising a connector to receive an expansion board, the connector comprising a contact; and
a controller comprising a pin connected to the contact, the controller to:
set the pin as an input pin at a first time during a detection process to determine the presence or absence of the expansion board in the connector;
detect, when the pin is set as the input pin, a state of a signal from the contact of the connector;
determine a presence or absence of the expansion board in the connector based on the detected state of the signal from the contact of the connector, wherein the determining comprises:
responsive to the signal having a first state as set by a passive circuit on the expansion board through the connector, indicating the presence of the expansion board in the connector;
set the pin as an output pin at a second time; and
send, through the pin when set as the output pin, a control indication from the controller through the contact of the connector to an electronic card connected to an expansion connector of the expansion board.

2. The system of claim 1, wherein the passive circuit comprises a resistor to pull the contact of the connector to the first state, the contact connected to the signal.

3. The system of claim 1, wherein the control indication comprises a test signal that is part of a test interface for testing the electronic card connected to the expansion connector of the expansion board.

4. The system of claim 3, wherein the test signal sent from the controller through the contact of the connector to the electronic card is a test reset signal to reset the electronic card or a test mode select signal to select a test mode of the electronic card.

5. The system of claim 1, wherein the controller is to:
determine a presence or absence of the electronic card in the expansion connector of the expansion board; and set the pin as the output pin at the second time responsive to determining that the electronic card is present in the expansion connector of the expansion board.

6. The system of claim 5, wherein the controller is to:

refrain from setting the pin as the output pin responsive to determining that the electronic card is not present in the expansion connector of the expansion board.

7. The system of claim 5, wherein the contact is a first contact, the connector has a second contact, and the controller is to:

determine that the electronic card is present in the expansion connector of the expansion board based on detecting a predefined pattern of a signal from the second contact of the connector.

8. The system of claim 7, wherein the predefined pattern of the signal from the second contact is driven by the electronic card in the expansion connector of the expansion board.

9. The system of claim 1, wherein the expansion board is a pass-through riser card that is without any active integrated circuits on the expansion board.

10. The system of claim 1, further comprising:

a memory, wherein the controller is to write, to the memory, a value indicating the presence or absence of the expansion board in the connector.

11. The system of claim 10, wherein the controller is to:

determine a presence or absence of the electronic card in the expansion connector of the expansion board; and write, to the memory, the value or a further value indicating the presence or absence of the electronic card in the expansion connector of the expansion board.

12. The system of claim 5, wherein the expansion board further comprises a system-side connector connected to the connector on the circuit board.

13. The system of claim 1, wherein the controller and the connector are on the circuit board.

14. A non-transitory machine-readable storage medium comprising instructions that upon execution cause a controller to:

set a pin of the controller as an input pin at a first time during a detection process to determine a presence or absence of an expansion board in a connector on a circuit board, the pin of the controller connected to a first contact of the connector;

detect, when the pin is set as the input pin, a first state of a first signal from the first contact of the connector;

indicate a presence of the expansion board in the connector based on the first state of the first signal from the first contact of the connector, wherein the first signal has the first state based on a passive circuit on the expansion board setting the first signal to the first state through the connector;

detect a signal pattern of a second signal from a second contact of the connector on the circuit board;

indicate a presence of an electronic card in an expansion connector of the expansion board based on the signal pattern of the second signal;

set the pin of the controller as an output pin at a second time; and send, through the pin when set as the output pin, a control indication from the controller through the first contact of the connector to the electronic card connected to the expansion connector of the expansion board.

15. The non-transitory machine-readable storage medium of claim 14, wherein the signal pattern is driven by the electronic card.

16. The non-transitory machine-readable storage medium of claim 14, wherein the instructions upon execution cause the controller to:

set the pin of the controller as the output pin at the second time responsive to detecting the presence of the electronic card in the expansion connector of the expansion board.

17. The non-transitory machine-readable storage medium of claim 14, wherein the instructions upon execution cause the controller to:

write, to a memory, a value indicating the presence of the expansion board in the connector and the presence of the electronic card in the expansion connector.

18. An expansion board for mounting in a connector of a circuit board, comprising:

a first connector to receive an electronic card;

a second connector to connect to the connector of the circuit board;

a passive circuit connected to a reference and to a contact of the second connector to provide a presence indication of the expansion board in the connector of the circuit board, wherein the contact is settable as an input to the circuit board at a first time during an expansion board detection process to determine a presence or absence of the expansion board in the connector of the circuit board, and wherein the contact is settable as an output from the circuit board at a second time to support a communication of a controller on the circuit board to the electronic card.

19. The expansion board of claim 18, wherein the expansion board is without any active integrated circuits.

20. The non-transitory machine-readable storage medium of claim 14, wherein the control indication comprises a test signal that tests the electronic card connected to the expansion connector of the expansion board.

* * * * *